US008284717B2

(12) United States Patent
Voyer et al.

(10) Patent No.: US 8,284,717 B2
(45) Date of Patent: Oct. 9, 2012

(54) METHOD AND A DEVICE FOR TRANSFERRING A FLOW OF DATA BY A FIRST TELECOMMUNICATION DEVICE TO A SECOND TELECOMMUNICATION DEVICE

(75) Inventors: Nicolas Voyer, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 688 days.

(21) Appl. No.: 12/407,168

(22) Filed: Mar. 19, 2009

(65) Prior Publication Data
US 2009/0253433 A1  Oct. 8, 2009

(30) Foreign Application Priority Data

Mar. 31, 2008  (EP) ..................... 08006221

(51) Int. Cl.
*H04W 4/00* (2009.01)
(52) U.S. Cl. ...................................................... 370/328
(58) Field of Classification Search .................. 370/328
See application file for complete search history.

(56) References Cited

U.S. PATENT DOCUMENTS

| 2002/0080888 | A1* | 6/2002 | Shu et al. ................. 375/295 |
| 2005/0143130 | A1* | 6/2005 | Horneman ................. 455/561 |
| 2007/0218881 | A1* | 9/2007 | Voyer et al. ............. 455/414.1 |
| 2007/0286125 | A1* | 12/2007 | Lee et al. ................. 370/331 |
| 2008/0049663 | A1* | 2/2008 | Voyer et al. ............. 370/328 |
| 2009/0233611 | A1* | 9/2009 | Olsson et al. ............. 455/446 |
| 2010/0062774 | A1* | 3/2010 | Motegi et al. ............. 455/437 |

FOREIGN PATENT DOCUMENTS

| DE | 10 2004 049 705 A1 | 4/2006 |
| EP | 1 873 929 A1 | 1/2008 |
| WO | WO 02/052787 A2 | 7/2002 |

OTHER PUBLICATIONS

"Handover Performance in 3GPP Long Term Evolution (LTE) Systems" by Andras Racz et al. In IEEE Mobile and Wireless Communications Summit—Jul. 2007.*
Dhananjay S. Phatak, et al., "A Novel Mechanism for Data Streaming Across Multiple IP Links for Improving Throughput and Reliability in Mobile Environments", Proceedings IEEE Infocom 2002, The Conference on Computer Communications, 21$^{st}$ Annual Joint Conference of the IEEE Computer and Communications Societies, XP010593639, vol. 2, Jun. 23, 2002, pp. 773-781.

* cited by examiner

*Primary Examiner* — Ayaz Sheikh
*Assistant Examiner* — Hai-Chang Hsiung
(74) *Attorney, Agent, or Firm* — Oblon, Spivak, McClelland, Maier & Neustadt, L.L.P.

(57) ABSTRACT

The present invention concerns a method for transferring a flow of data by a first telecommunication device to a second telecommunication device in a wireless cellular telecommunication network, the first and second telecommunication devices being linked through a radio channel, characterized in that the method comprises the steps executed by the first telecommunication device of:
  splitting the flow of data in at least two splits,
  transferring a first split to the second telecommunication device through the radio channel,
  transferring at least a second split to the second telecommunication device via at least a third telecommunication device, the third telecommunication device being a first base station of the wireless cellular telecommunication network.

13 Claims, 6 Drawing Sheets

METHOD AND A DEVICE FOR TRANSFERRING A FLOW OF DATA BY A FIRST TELECOMMUNICATION DEVICE TO A SECOND TELECOMMUNICATION DEVICE

BACKGROUND OF THE INVENTION

The present invention relates generally to a method and a device for transferring a flow of data by a first telecommunication device to a second telecommunication device.

In wireless cellular telecommunication networks, one transmitter transfers data to one receiver via one radio channel. When the receiver is moving away from the transmitter, the network routes data to the receiver via another transmitter enabling a handover between the two transmitters.

In wireless cellular telecommunication networks using Code Division Multiple Access scheme, a specific variant of handover has been developed, which is called soft handover. In such situation, the same data is transmitted by different transmitters in the vicinity of a mobile terminal which includes multiple receivers. The mobile terminal combines the energies of the signal received from the multiple transmitters in order to increase the quality of the received signal.

In a variant of soft handover, called Site Selection Diversity Transmission, the mobile terminal can select which transmitter can transmit the data. The interference level is reduced as only the best transmitter transmits signal with the minimum power level needed to reach the receiver. In case of independent fading over the multiple transmitters, SSDT can be an effective technique to avoid fading and degradation of signal level in handover areas.

SSDT requires that the scheduling of data over the multiple transmitters is controlled by a central entity called Radio Network Controller. The Radio Network controller transmits the data to each transmitter, even if data need not to be used by the transmitter. That method produces significant overhead between RNC and transmitters. It has to be noted here that the SSDT can not be applied as such in the Third Generation Project/Long Term Evolution 3GPP/LTE network under discussion, where the network no longer deals with a central entity like a RNC.

Furthermore, in classical wireless cellular telecommunication network, the data transferred between transmitters and receivers are encrypted in order to warrant the privacy of the transferred data.

SUMMARY OF THE INVENTION

The present invention aims at providing a wireless cellular telecommunication network which enables the transfer of data between a base station and a mobile terminal at a higher throughput than classical wireless cellular telecommunication network.

The present invention aims at providing a wireless cellular telecommunication network which enables the transfer of data between a base station and a mobile terminal with a higher security level than the one provided by classical wireless cellular telecommunication network.

To that end, the present invention concerns a method for transferring a flow of data by a first telecommunication device to a second telecommunication device in a wireless cellular telecommunication network, the first and second telecommunication devices being linked through a radio channel, characterized in that the method comprises the steps executed by the first telecommunication device of:

splitting the flow of data in at least two splits,
 transferring a first split to the second telecommunication device through the radio channel,
 transferring at least a second split to the second telecommunication device via at least a third telecommunication device, the third telecommunication device being a first base station of the wireless cellular telecommunication network.

The present invention concerns also a device for transferring a flow of data by a first telecommunication device to a second telecommunication device in a wireless cellular telecommunication network, the first and second telecommunication devices being linked through a radio channel, characterized in that the device is included in the first telecommunication device and comprises:

means for splitting the flow of data in at least two splits,
 means for transferring a first split to the second telecommunication device through the radio channel,
 means for transferring at least a second split to the second telecommunication device via at least a third telecommunication device, the third telecommunication device being a first base station of the wireless cellular telecommunication network.

Thus, the flow of data transferred between the first telecommunication device and the second telecommunication device can be delivered with higher throughput, as it can benefit from both the throughput of the split between the first telecommunication device and the second telecommunication device and from the throughput of the split between the second telecommunication device and the third telecommunication device.

Furthermore, by splitting the flow of data into plural splits which are transferred by different telecommunication devices, the present invention provides a wireless cellular telecommunication network which enables the transfer of data between a base station and a mobile terminal at a higher security level than the one provided by classical wireless cellular telecommunication network.

Only the mobile terminal, which is located in the area in which each of these splits can be received, can obtain the complete flow of data.

If another mobile terminal gets only a part of the splits, it will not be able to retrieve the flow of data.

According to a first embodiment, the first telecommunication device is a second base station of the wireless cellular telecommunication network and the second telecommunication device is a mobile terminal.

Thus, the throughput of the data flow delivered between the second base station and the mobile terminal can be extended by using the extra throughput available between the first base station and the mobile terminal. The split of the data flow is realised by the second base station and requires no external node.

According to a particular feature, the first telecommunication device:

receives, from the mobile terminal, a measurement report on signals transferred by plural base stations,
 determines, from the measurement report, if the flow of data has to be split in a more important or less important number of splits.

Thus, if extra throughput is available between the mobile terminal and other base stations, as can be determined by the second base station from the measurement report received from the mobile terminal, the throughput of the data flow can be further extended using supplementary splits with the other base stations.

According to a particular feature, if the flow of data has to be split in a more important number of splits, the first telecommunication device:

establishes a link between the second base station and a third base station which transferred signals on which measurement reported by the mobile terminal are upper than a given value, obtains from the third base station information related to a radio channel between the third base station and the mobile terminal, transfers the information related to the radio channel to the mobile terminal, splits the flow of data into an incremented number of splits, transfers the supplementary split to the mobile terminal via the third base station through the established link.

Thus, the extra throughput available between the third base station and the mobile terminal is effectively used for extending the throughput of the data flow between the first telecommunication device and the mobile terminal.

The mobile terminal is informed of details of the radio channel to be established with the third base station, and is ready to receive additional data packet via the established new radio channel.

According to a particular feature, if the flow of data has to be split in a less important number of splits, the first telecommunication device:

releases the link between the second base station and the first base station, transfers to the mobile terminal information related to the radio channel between the first base station and the mobile terminal, splits the flow of data into a reduced number of splits.

Thus, if the radio channel established between the first base station and the mobile terminal no longer brings any extra throughput, e.g. due to cell overloading, or due to vanishing radio conditions, the mobile terminal no longer maintains the radio channel established with the first base station. The power consumption of the mobile terminal is enhanced and the uses of processing resources and memory are enhanced. The lifetime of the battery of the mobile terminal can be extended.

Furthermore, the link between the first and second base station is released if it no longer brings any extra throughput to the data flow between the first telecommunication device and the mobile terminal. The consumption of both first and second base stations is enhanced in terms of power, processing power and memory.

According to a particular feature, the first telecommunication device:

receives packets from the first base station prior to the release of the link between the second base station and a first base station, transfers the received packets to the mobile terminal.

Thus, if data packets sent by the second base station to the mobile terminal via the first base station are not received by the mobile terminal at the time the radio channel is being released between the mobile terminal and the first base station, the data packets are not lost and are sent to the mobile terminal by the second base station via at least another radio channel. The reduction of the number of split brings no loss of data.

According to a particular feature, the first telecommunication device:

receives from a fourth base station a message representative of a request to establish a link between the second base station and the fourth base station and of a request to establish a radio channel with another mobile terminal, establishes a link between the second base station and the fourth base station, determines information related to the radio channel between the second base station and the other mobile terminal, establishes the radio channel between the second base station and the other mobile terminal.

transfers information related to the radio channel between the second base station and the other mobile terminal to the fourth base station.

Thus, the throughput of the data flow between the fourth base station and the other mobile terminal can be effectively extended with the throughput of the established radio channel between the second base station and the other mobile terminal.

Furthermore, the second base station can determine alone the usage of its radio resource and related parameters contained in the information related to the radio channel even if these radio resources have to be provided to other mobile terminal by a fourth base station. This fully decentralised mechanism is very robust to any conflict between base stations related to management of radio resource.

According to a particular feature, the first telecommunication device:

receives data from the fourth base station through the link between the second base station and the fourth base station, transfers through the radio channel established between the second base station and the other mobile terminal the data received from the fourth base station.

Thus, the other mobile terminal can effectively receive additional data packets from the fourth base station via the second base station. The downlink throughput of the data flow between the mobile terminal and the fourth base station is effectively enhanced.

According to a particular feature, the first telecommunication device:

receives data from the other mobile terminal through the radio channel established between the second base station and the other mobile terminal, transfers through the link between the second base station and the fourth base station the data received from the other mobile terminal.

Thus, the fourth base station can effectively receive additional data packets from the other mobile terminal via the second base station. The uplink throughput of the data flow between the mobile terminal and the fourth base station is effectively enhanced.

According to a particular feature, the first telecommunication device:

receives from the fourth base station a message representative of a request to release a link between the second base station and the fourth base station, stops transmitting data received from the fourth base station to the other mobile terminal through the radio channel established between the second base station and the other terminal, checks if data transferred through the radio channel between the second base station and the other mobile terminal have not been acknowledged by the mobile terminal, transfers the data to the fourth base station if data have not been acknowledged.

Thus, data received by the second base station from the fourth base station which could not be delivered to the other mobile terminal over the radio channel established between the second base station and the other mobile terminal, e.g. due to lack of coverage or in case of cell overloading, can be yet delivered by the fourth base station to the mobile terminal via at least another radio channel.

Furthermore, the capacity of the cell of the second base station is not wasted for the transmission of data packets to the other mobile terminal, which can not be properly received by the mobile terminal due e.g. to lack of coverage. This capacity can be used by the second base station to send other data packet to yet other mobile terminal. The capacity of the cell of the second base station is increased.

According to a particular feature, the first telecommunication device:
- releases the link between the second base station and the fourth base station,
- releases the radio channel between the second base station and the other mobile terminal.

Thus, the power consumption of the mobile terminal is enhanced, the uses of processing resources and memory are enhanced. The capacity of the cell of the second base station is increased and the capacity of the telecommunication network linking first and fourth base stations is also increased.

According to a second embodiment, the first telecommunication device is a mobile terminal and the second telecommunication device is a second base station of the wireless cellular telecommunication network.

Thus, the throughput of the data flow delivered between the mobile terminal and the second base station can be extended by using the extra throughput available between the first base station and the second base station. The split of the data flow is realised by the mobile terminal and requires no external node.

According to a particular feature of the second embodiment, the first telecommunication device:
- measures signals transferred by plural base stations,
- transfers to the second base station a measurement report representative of the measurements.

Thus, the mobile terminal can help the second base station to know if extra throughput can be achieved for the data flow between the mobile terminal and the base station, by using a supplementary split passing via other base stations.

According to a particular feature of the second embodiment, the first telecommunication device:
- receives a message comprising information related to a radio channel to be setup between the mobile terminal and a third base station,
- establishes the radio channel between the mobile terminal and the third base station,
- splits the flow of data in an incremented number of splits,
- transfers the supplementary split to the second base station via the third base station through the established radio channel.

Thus, the mobile terminal can effectively get benefit from the extra throughput available between the third base station and the mobile terminal so as to extend the throughput of the data flow between the mobile terminal and the second base station.

According to a particular feature of the second embodiment, the first telecommunication device:
- receives a message requesting the release of the radio channel established between the mobile terminal and the first base station,
- releases the radio channel established between the mobile terminal and the first base station,
- splits the flow of data into a reduced number of splits.

Thus, the power consumption of the mobile terminal is enhanced, the uses of processing resources and memory are enhanced. The capacity of the cell of the first base station is increased.

According to a particular feature of the second embodiment, prior to the release of the radio channel between the first base station and the mobile terminal, the first telecommunication device:
- checks if data transferred through the radio channel between the mobile terminal and the first base station have not been acknowledged by the first base station,
- transfers the non acknowledged data to the second base station through another radio channel.

Thus, if data packets sent by the mobile terminal to the second base station via the first base station are not received by the second base station at the time the radio channel is being released between the mobile terminal and the first base station, the data packets are not lost and are sent to the second base station by the mobile terminal via at least another radio channel. The reduction of the number of split brings no loss of data.

According to a particular feature of the first and second embodiments, the flow of data is decomposed into packets of data and each split is decomposed into different packets of data, each packet of data being marked by an information representative of the order of the packet of data in the flow of data.

Thus, the data packets received by the first telecommunication device and by the second telecommunication device can be reordered in sequence, regardless of repetitions over radio channels, or crossing of packets over parallel radio channels. The enhanced throughput of the data flow is robust to in-sequence sensitive applications, such as video or speech applications.

The present invention concerns also a method for receiving, by a first telecommunication device, a flow of data from a second telecommunication device in a wireless cellular telecommunication network, the first and second telecommunication devices being linked through a radio channel, characterized in that the method comprises the steps executed by the first telecommunication device of:
- receiving a first split of the flow of data from the second telecommunication device through the radio channel,
- receiving a second split of the flow of data from the second telecommunication device via a third telecommunication device, the third telecommunication device being a first base station of the wireless cellular telecommunication network,
- reconstructing the flow of data from the two splits.

The present invention concerns also a first telecommunication device which receives a flow of data from a second telecommunication device in a wireless cellular telecommunication network, the first and second telecommunication devices being linked through a radio channel, characterized in that the first telecommunication device comprises:
- means for receiving a first split of the flow of data from the second telecommunication device through the radio channel,
- means for receiving a second split of the flow of data from the second telecommunication device via a third telecommunication device, the third telecommunication device being a first base station of the wireless cellular telecommunication network,
- means for reconstructing the flow of data from the two splits.

Thus, the flow of data transferred between the first telecommunication device and the second telecommunication device can be delivered with higher throughput, as it can benefit from both the throughput of the split between the first telecommunication device and the second telecommunication device and from the throughput of the split between the second telecommunication device and the third telecommunication device.

Furthermore, by splitting the flow of data into plural splits which are transferred by different telecommunication devices, the present invention provides a wireless cellular telecommunication network which enables the transfer of data between a base station and a mobile terminal at a higher security level than the one provided by classical wireless cellular telecommunication network.

Only the mobile terminal which is located in the area in which each of these splits can be received can obtain the complete flow of data.

If another mobile terminal gets only a part of the splits, it will not be able to retrieve the flow of data.

According to a particular feature, the flow of data is decomposed into packets of data, each packet of data being marked by information representative of the order of the packet of data in the flow of data and the flow of data is reconstructed using the information representative of the order of the packet of data in the flow of data.

Thus, the data packets of one same data flow received by the first telecommunication device from different splits can be reordered in sequence, regardless of repetitions over radio channels, or crossing of packets over parallel radio channels. The enhanced throughput of the data flow is robust to in-sequence sensitive applications, such as video or speech applications.

According to the first embodiment, the first telecommunication device is a second base station of the wireless cellular telecommunication network and the second telecommunication device is a mobile terminal.

Thus, the data packets of one same data flow received by the second base station over different splits established with the mobile terminal can be reordered in sequence, regardless of repetitions over radio channels, or crossing of packets over parallel radio channels, the said radio channels being established with other base stations. The enhanced throughput of the data flow is robust to in-sequence sensitive applications, such as video or speech applications.

According to the second embodiment, the first telecommunication device is a mobile terminal and the second telecommunication device is a second base station of the wireless cellular telecommunication network.

Thus, the data packets of one same data flow received by the mobile terminal over different splits established with the second base station can be reordered in sequence, regardless of repetitions over radio channels, or crossing of packets over parallel radio channels, the said radio channels being established with other base stations. The enhanced throughput of the data flow is robust to in-sequence sensitive applications, such as video or speech applications.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION OF THE INVENTION

Figure 1:
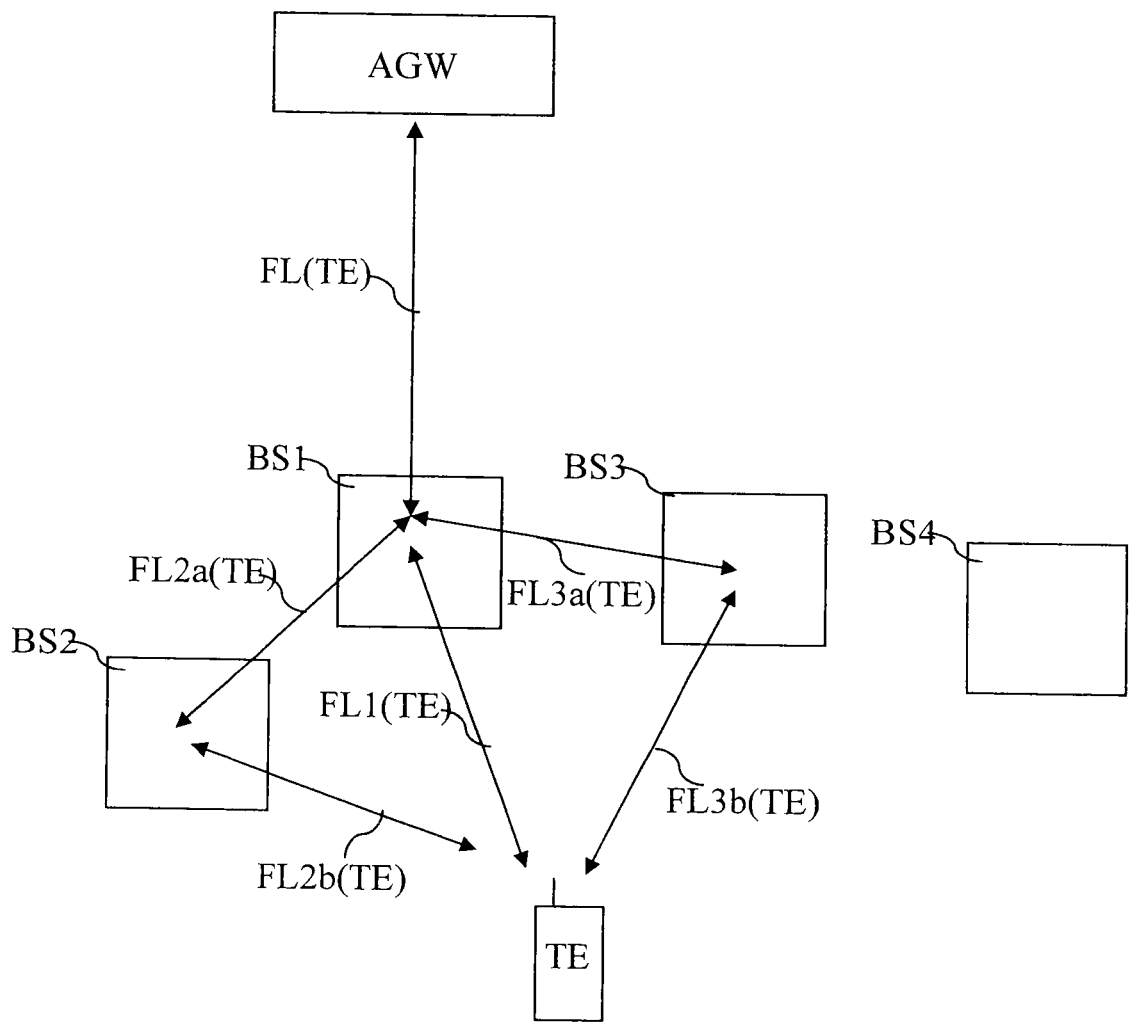
FIG. 1 is a diagram representing the architecture of the wireless cellular telecommunication network in which the present invention is implemented.

FIG. 1 is a diagram representing the architecture of the wireless cellular telecommunication network in which the present invention is implemented.

In the cellular telecommunication network, a server AGW is connected to a plurality of base stations BS1 to BS4 through a telecommunication network. The telecommunication network is a dedicated wired network or a public network like a public switched network or an IP based network or a wireless network or an Asynchronous Transfer Mode network or a combination of above cited networks.

The telecommunication network enables the base stations BS1 to BS4 to be connected together if needed and enables the transfer between the base stations BS of at least a split of a flow of data intended to be transferred to a mobile terminal TE and/or enables the transfer between the base stations BS of at least a split of a flow of data transferred by a mobile terminal TE.

In the FIG. 1, only one server AGW is shown, but we can understand that a more important number of servers AGW can be used in the present invention.

On a similar way, only four base stations BS1 to BS4 are shown, but we can understand that a more important number of base stations BS are used in the present invention.

In Long Term Evolution (LTE) network currently under discussion in 3GPP, the server AGW is named an Access Gateway, and contains at least one Mobility Management Entity (MME) and one User Plane Entity (UPE). In General Packet Radio Service network, the server AGW is named a Serving GPRS Support Node (SGSN). In mobile IP network, the server AGW is named a Foreign Agent (FA) and in GSM network, the server AGW contains a Visitor Location Register (VLR) and a Mobile Switching Centre (MSC).

Each base station BS1 to BS4 manages at least one cell not shown in the FIG. 1. A cell of a base station BS is the area in which the signals transferred by the base station BS are received by a mobile terminal TE at a power level which is upper than a predetermined value.

In the FIG. 1, only one mobile terminal TE is shown, but we can understand that a more important number of mobile terminals TE are in the wireless cellular telecommunication network.

Each base station BS, as example the base station BS1, may transfer in the cell it manages, a monitoring list comprising information identifying the cells of other base stations BS. The mobile terminal TE monitors the signals transferred in these cells and sends measurement reports to the base station BS1 which handles the mobile terminal TE.

A base station BS handles a mobile terminal TE when the base station BS receives from the server AGW a flow of data to be transferred to the mobile terminal TE and/or transfers to the server AGW a flow of data transferred by the mobile terminal TE.

When a flow of data has to be transferred to the mobile terminal TE, the flow of data is transferred from the server AGW to the base station BS which handles the mobile terminal TE. When a flow of data is transferred by the mobile terminal TE, the flow of data is transferred from the base station BS which handles the mobile terminal TE to the server AGW. That flow of data is shown by the arrow noted FL(TE).

According to the invention, the base station BS which handles the mobile terminal TE splits the flow of data to be transferred to the mobile terminal TE in at least two parts. A first split is directly transferred by the base station BS which handles the mobile terminal TE to the mobile terminal TE through its wireless interface and at least a second split is transferred by the base station BS which handles the mobile terminal TE to the mobile terminal TE through its network interface and at least a via base station BS.

According to the invention, the mobile terminal TE receives the at least two splits and reconstructs the flow of data.

According to the invention, the mobile terminal TE splits the flow of data to be transferred to the base station BS which handles it in at least two parts.

According to the invention, the base station BS which handles the mobile terminal TE receives at least two splits of a flow of data transferred by the mobile terminal TE. A first split is received from the mobile terminal TE directly by the base station BS which handles the mobile terminal TE through its wireless interface and at least a second split is received from the mobile terminal TE by the base station BS which handles the mobile terminal TE through at least a via base station BS. The base station BS which handles the mobile terminal TE reconstructs the flow of data.

The FIG. 1 discloses an example in which the base station BS1 handles the mobile terminal TE.

The base station BS1 receives a flow of data represented by the arrow FL(TE) to be transferred to the mobile terminal TE. The base station BS1 splits the flow of data FL(TE) to be transferred to the mobile terminal TE in three splits. A first split represented by the arrow FL1(TE) is directly transferred by the base station BS1 to the mobile terminal TE through its wireless interface. A second split represented by the arrow FL2a(TE) is transferred by the base station BS1 to the base station BS2 which transfers, through its wireless interface, the split represented by the arrow FL2b(TE) to the mobile terminal TE. A third split represented by the arrow FL3a(TE) is transferred by the base station BS1 to the base station BS3 which transfers, through its wireless interface, the split represented by the arrow FL3b(TE) to the mobile terminal TE.

The mobile terminal TE receives the three splits and reconstructs the flow of data.

The mobile terminal TE splits the flow of data to be transferred to the base station BS1 in a first part represented by the arrow FL1(TE), a second part represented by the arrow FL2b(TE) and a third part represented by the arrow FL3b(TE).

The base station BS2 transfers the received split to the base station BS1 as represented by the arrow FL2a(TE).

The base station BS3 transfers the received split to the base station BS1 as represented by the arrow FL3a(TE).

The base station BS1 which handles the mobile terminal TE receives the three splits of the flow of data transferred by the mobile terminal TE. The base station BS1 reconstructs the flow of data and transfers it to the server 10, as represented by the arrow FL(TE).

Figure 2:
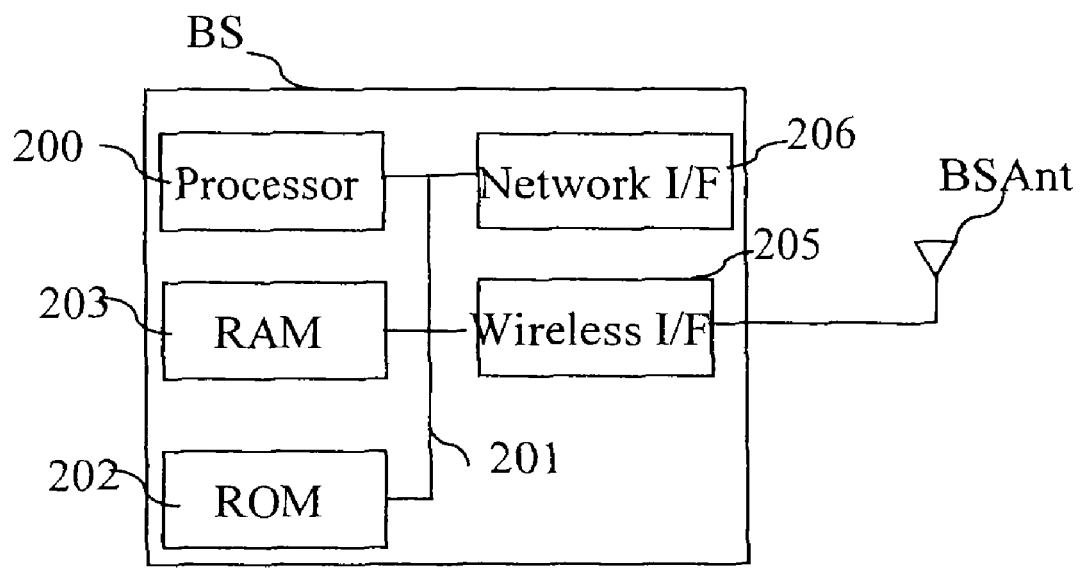
FIG. 2 is a diagram representing the architecture of a base station according to the present invention.

FIG. 2 is a diagram representing the architecture of a base station according to the present invention.

Figure 6:
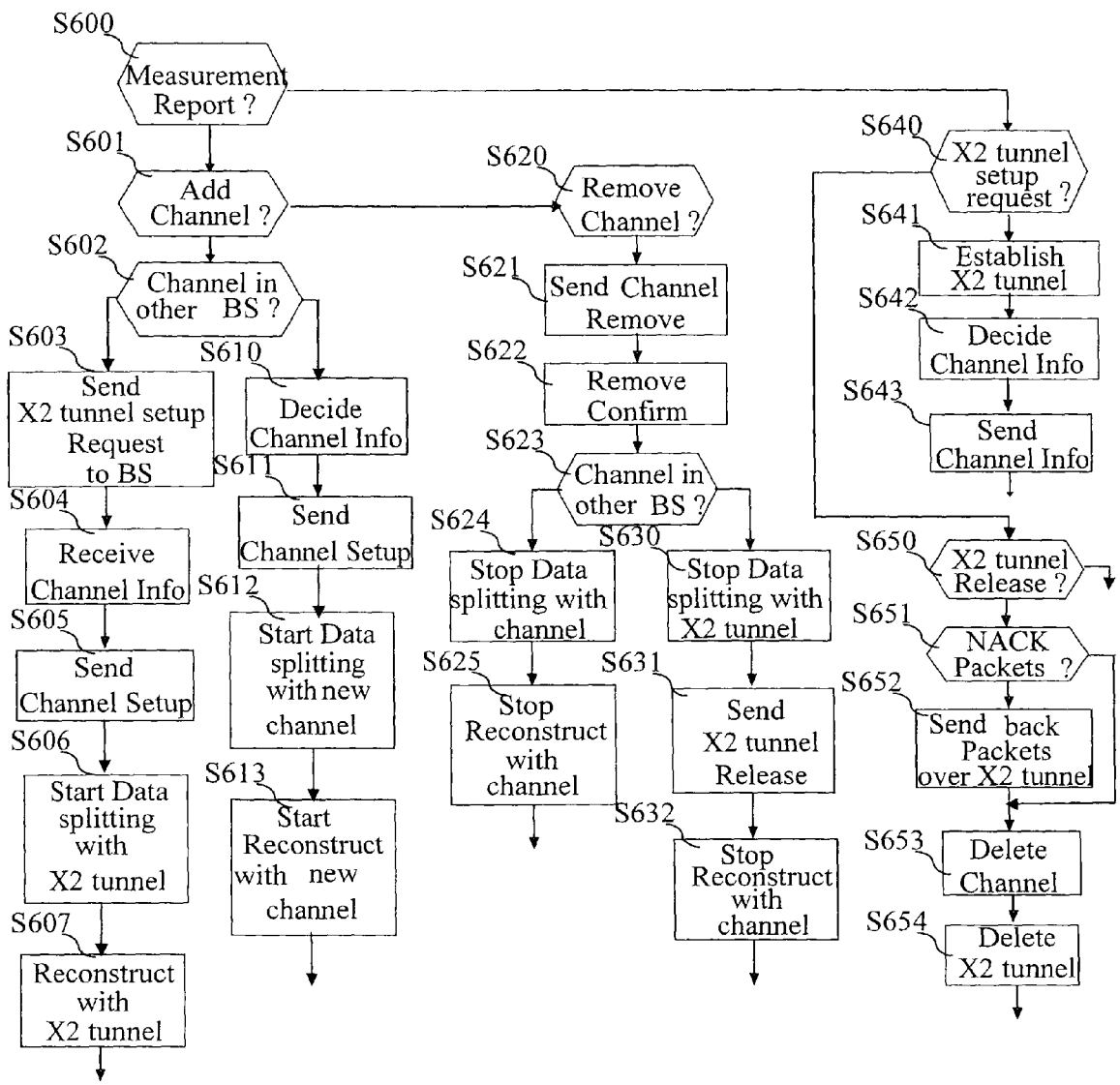
FIG. 6 is a first algorithm executed by a base station according to the present invention.
Figure 7:
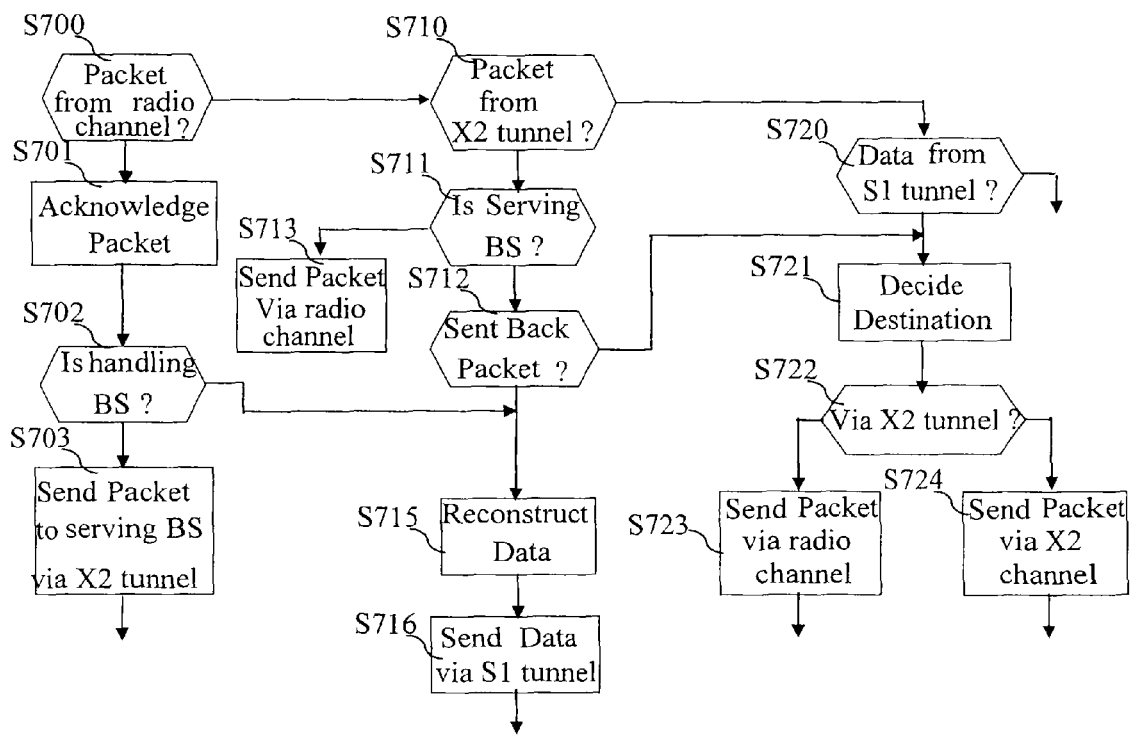
FIG. 7 is a second algorithm executed by a base station according to the present invention.

Each base station BS has, for example, an architecture based on components connected together by a bus 201 and a processor 200 controlled by the program as disclosed in the FIGS. 6 and 7.

The bus 201 links the processor 200 to a read only memory ROM 202, a random access memory RAM 203, a network interface 206 and a wireless interface 205.

The memory 203 contains registers intended to receive variables, information identifying cells like cells which are known as neighbour of the cell or cells of the base station BS, the identifiers of the base stations BS which manage neighbour cells, connection, security information for each communication link with base stations BS which manage neighbour cells and the instructions of the program related to the algorithms as disclosed in the FIGS. 6 and 7.

The processor 200 controls the operation of the network interface 206 and the wireless interface 205.

The read only memory 202 contains instructions of the programs related to the algorithms as disclosed in the FIGS. 6 and 7, which are transferred, when the base station BS is powered on to the random access memory 203.

The base station BS is connected to the telecommunication network through the network interface 206. As example, the network interface 206 is a DSL (Digital Subscriber Line) modem, or an ISDN (Integrated Services Digital Network) interface, etc.

Through such interface, the base station BS exchanges information with the server AGW and the other base stations BS of the wireless cellular telecommunication network.

Through the wireless interface 205, the base station BS transfers monitoring lists of information identifying cells and receives, from the mobile terminal TE, measurement reports.

The wireless interface 205 is connected to one antenna BSant, that is used to collect and radiate radiowaves from/to the mobile terminal TE.

In the FIG. 2, only one antenna BSant is shown, but we can understand that a more important number of antennas BSant can be used in the present invention.

The wireless interface 205 may comprise means for a simultaneous transmission of at least two signals to be transferred to one or plural mobile terminals TE using as example Multiple Input Multiple Output (MIMO) or transmit beamforming techniques or using plural transmission modules working as example in different frequency bands.

The wireless interface 205 may comprise means for a simultaneous reception of at least two signals transferred by one or plural mobile terminals TE using as example MIMO or receive beamforming techniques or using plural reception modules working as example in different frequency bands.

Figure 3:
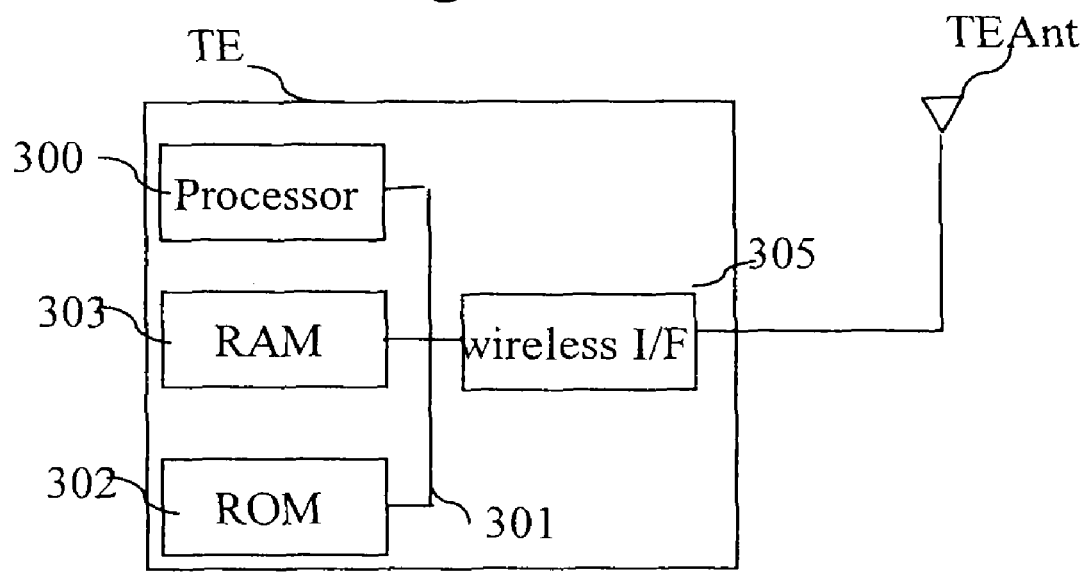
FIG. 3 is a diagram representing the architecture of a mobile terminal of the wireless telecommunication system according to the present invention.

FIG. 3 is a diagram representing the architecture of a mobile terminal of the wireless telecommunication system according to the present invention.

Figure 8:
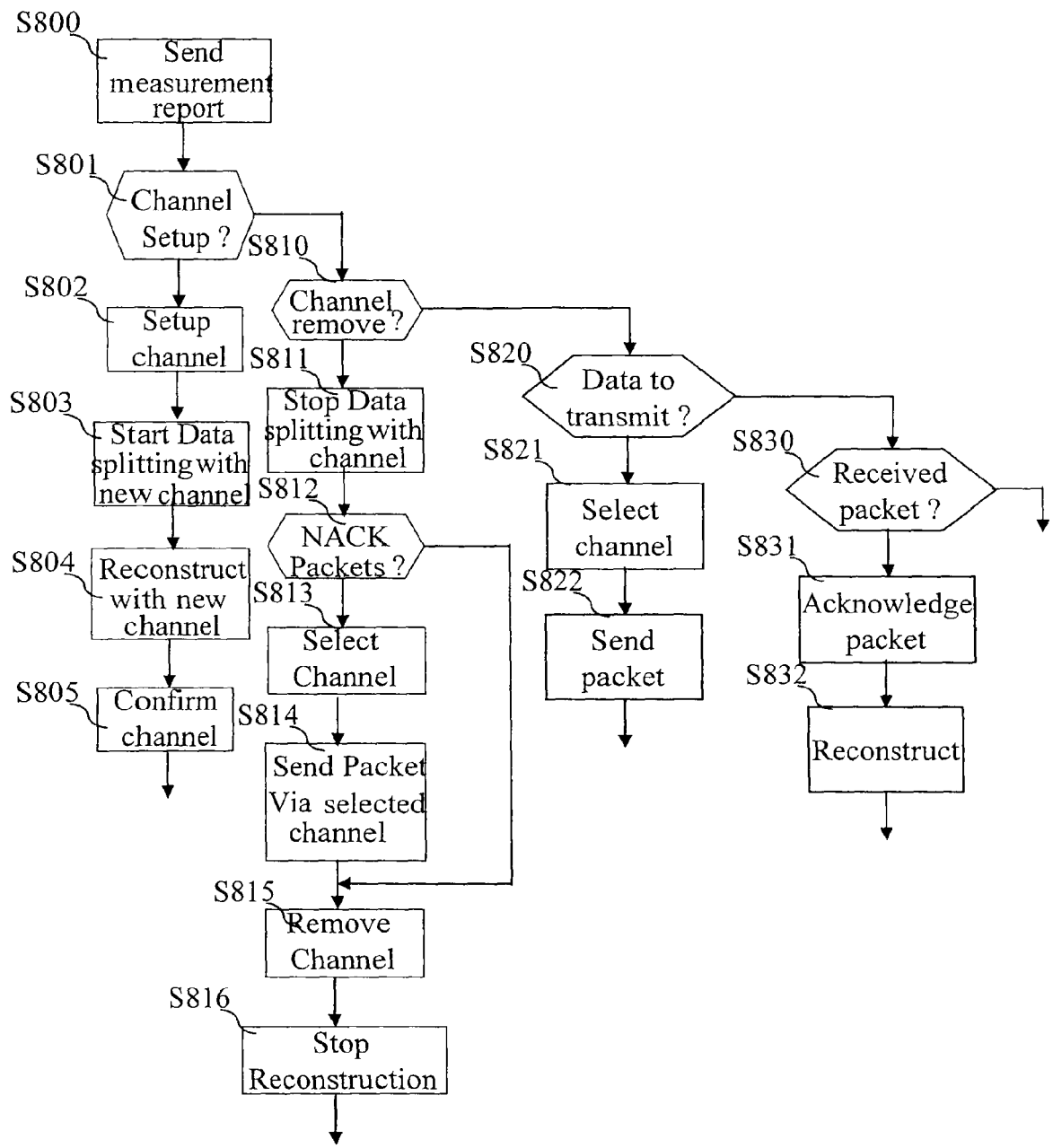
FIG. 8 is an example of an algorithm executed by a mobile terminal according to the present invention.

Each mobile terminal TE has, for example, an architecture based on components connected together by a bus 301 and a processor 300 controlled by the program as disclosed in FIG. 8.

The bus 301 links the processor 300 to a read only memory ROM 302, a random access memory RAM 303 and a wireless interface 305.

The memory 303 contains registers intended to receive variables and the instructions of the program related to the algorithm as disclosed in FIG. 8.

The read only memory 302 contains instructions of the program related to the algorithm as disclosed in FIG. 8, which are transferred, when the mobile terminal TE is powered on to the random access memory 303.

The wireless interface 305 comprises means for detecting, measuring and receiving signals transferred by base stations BS through the downlink channel, and for transmitting measurement reports through the uplink channel of the wireless cellular communication system.

The wireless interface 305 is connected to one antenna TEAnt, that is used to collect and radiate radiowaves from/to the base stations BS.

In the FIG. 3, only one antenna TEAnt is shown, but we can understand that a more important number of antennas TEAnt can be used in the present invention.

The wireless interface 305 comprises means for simultaneous transmission of at least two signals to be transferred to different base stations BS using as example MIMO or transmit beamforming techniques or using plural transmission modules working as example in different frequency bands.

The wireless interface 305 may comprise means for a simultaneous reception of at least two signals transferred by different base stations BS using as example MIMO or receive beamforming techniques or using plural reception modules working as example in different frequency bands.

Figure 5:
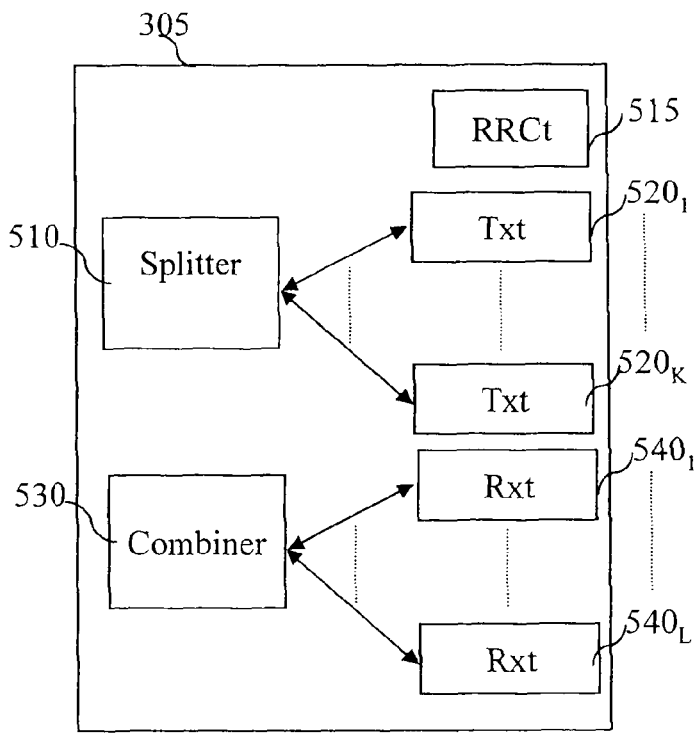
FIG. 5 is a diagram representing modules comprised in the wireless interface of a mobile terminal according to the present invention.

The wireless interface 305 will be disclosed in more details in reference to the FIG. 5.

Figure 4:
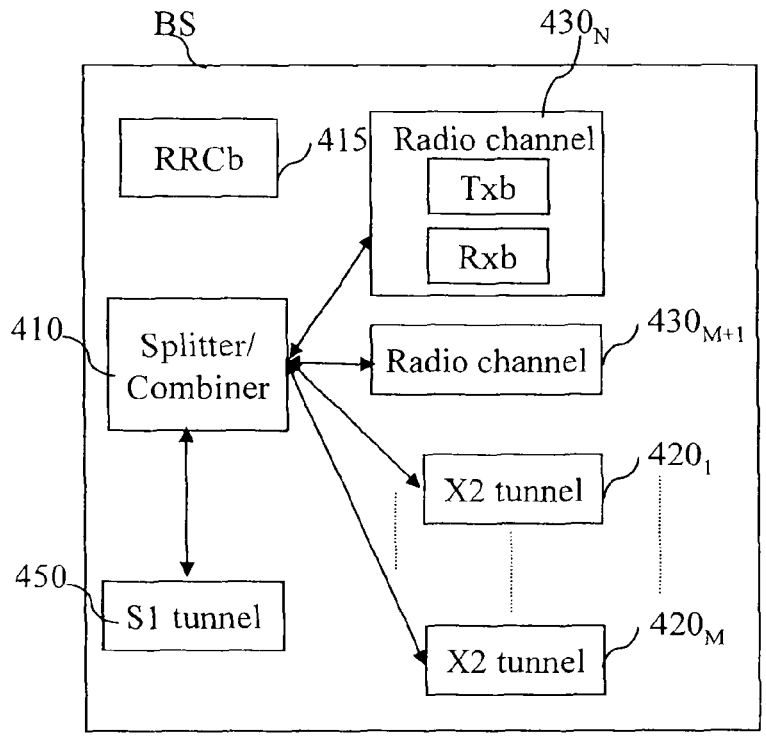
FIG. 4 is a diagram representing modules comprised in the base station according to the present invention.

FIG. 4 is a diagram representing modules comprised in the base station according to the present invention.

The base station BS comprises a splitter/combiner 410 which splits the flow of data to be transferred to the mobile terminal TE into N plural splits. A split comprises data which are different from the one comprised in another split and corresponds to different portions of the data flow. More precisely, the flow of data is decomposed into packets of data, each split is decomposed into different packets of data, each packet of data is marked by the splitter 410 with an information representative of the order of the packet of data in the flow of data.

The information representative of the order of the packet of data in the flow of data is as example a timestamp or a sequence number.

In a variant of realization, the processor 200 of the base station BS executes the tasks of splitting the flow of data and/or combining the splits in place of the splitter/combiner 410.

The base station BS comprises M X2 tunnels modules $420_1$ to $420_M$ for establishing M X2 tunnels which enable the transfer and/or the reception of data with other base stations BS and a S1 tunnel module 450 for establishing a S1 tunnel which can exchange data between the base station BS and the server AGW.

A X2 tunnel is as the one disclosed in the specification entitled 3GPP TS 36.424 and A S1 tunnel is as the one disclosed in the specification entitled 3GPP TS 36.414.

Through each X2 tunnel module 420, one split is transferred and/or received.

Complementary to what is shown in the FIG. 4, the N-M splits which are not transferred and/or received through one X2 tunnel module 420, are each transferred and/or received directly by the base station BS through one radio module 430 of its wireless interface 205 which comprises N-M radio modules $430_{M+1}$ to $430_N$.

Each radio module 430 comprises a transmitter Txb and a receiver Rxb.

As example, each radio module contains a Radio Link Control (RLC) stack and a Medium Access Control (MAC) stack, responsible for segmenting and scheduling downlink data packets on the transmitter Txb and scheduling transmission grants of uplink data packets to be received by the receiver Rxb, using varying transfer formats Modulation and Coding Scheme (MCS) so as to fit with instantaneous quality of the physical link PHY established with the mobile terminal TE and so as to share the capacity of the wireless channel with other mobile terminals TE having established a radio channel with the base station BS.

The base station BS comprises a Radio Resource Control RRCb protocol module, which is used to configure the transmission scheme according to the invention by indicating to the Radio Resource Control RRCt protocol module of the mobile terminal TE how data are split.

RRCt protocol module of the mobile terminal TE will be further described in the FIG. 5.

In a variant of realization, the processor 200 of the base station BS executes the tasks of the Radio Resource Control RRCb protocol module.

When a split of data is received through one reception module Rxb from a mobile terminal TE not handled by the base station BS, the split of data is forwarded to the base station BS which handles the mobile terminal TE through the X2 tunnel 420 established between the base station BS and the base station BS which handles the mobile terminal TE.

According to the invention, each via base station BS regularly sends quality indicator information to the splitter/combiner 410 through the X2 tunnel. The splitter/combiner 410 uses the quality indicator information transferred by each via base station BS to determine, on a per packet basis, through which X2 tunnel each packet of the data flow to be transmitted to the mobile terminal TE should individually be routed, enabling the realisation of different splits with different throughputs.

The quality indicator information are as example, the achievable throughput of the split of data being delivered by the via base station BS to the mobile terminal TE. It might be derived from the analysis of the capacity or the quality of the radio channel established between the via base station BS and the mobile terminal TE, e.g. derived from Channel Quality Indicators (CQI) reported by the mobile terminal TE to the via base station BS, and/or from the status of FIFO (full, expanding, steady, shrinking, empty) of the via base station BS containing the packets of data of the split received from the base station BS and not yet delivered to the mobile terminal TE, and/or from the load of the cell used by the radio channel established between the via base station BS and the mobile terminal TE.

Channel Quality Indicators are as example as the ones forwarded in 3GPP/LTE (Third Generation Project/Long Term Evolution) system by a mobile terminal TE to the base station BS. The CQI gives the level of SINR of the pilot signals transmitted by the base station BS and observed by the mobile terminal TE for a given time/frequency position (radio chunk). CQI information is typically provided for all radio chunks supported by the radio channel established between the transmitter and the receiver.

As example, the load of a cell depends on the throughput being delivered on that cell to other mobile terminals TE via other radio channels of the via base station BS.

FIG. 5 is a diagram representing modules comprised in the wireless interface of a mobile terminal according to the present invention.

The wireless interface 305 splits the flow of data to be transferred to the base station BS which handles the mobile terminal TE into K independent splits using a splitter 510. A split comprises data which are different from the one comprised in another split and corresponds to different portions of the data flow.

Each split is directed towards a respective transmission module Txt noted $520_1$ to $520_K$. A transmission module Txt basically contains one or more FIFO (First In First Out) buffers. FIFO has typically limited size and contains data to be transmitted by transmitter Txt. FIFO length is reduced at regular transmission intervals, by the amount of data that is transmitted by the transmission module Txt during that transmission interval. Reciprocally, FIFO length is increased each time the transmitter Tx receives data from the splitter.

Each transmitter Txt also contains a Radio Link Control RLC not shown in the FIG. 5, so as to solve any transmission error by means of repetition using an acknowledgment (ARQ), and a Medium Access Control MAC function, so as to minimise any transmission errors due to interference from other transmitters, by means of schedulers, and also means to optimise the transfer format using dynamic Modulation Coding Scheme according to instantaneous link quality of the physical link PHY.

According to the invention, the transmitter Txt regularly sends quality indicator information to the splitter 510. The splitter 510 uses the quality indicator information coming from all the transmitters Txt in order to determine, on a per packet basis, to which transmitter Txt each packet of the flow of data to be transferred to the serving base station BS should individually be routed, enabling the realisation of different splits with different throughputs.

As example, and in a non limitative way, the quality indicator information consists in the FIFO status (full, expanding, steady, shrinking, empty), in the estimated radio link quality of the physical link PHY, the achievable data rate over the physical link PHY between transmitter Txt and corresponding receiver Rxb of the base station BS which handles the mobile terminal TE or of the via base station BS or is a load indication of the physical link PHY.

As example, the load indication of the physical link PHY is the throughput being granted by the base station BS with which the physical link PHY is established.

The wireless interface 305 comprises a combiner 530 which combines the L splits transferred by the base station BS which handles the mobile terminal TE directly or via other base stations BS.

Each receiver Rxt $540_1$ to $540_L$ receives a split from a given transmitter Txb of a base station BS and might exchange with that transmitter Txb some RLC/MAC/PHY control signalling to contribute to the quality of reception of the physical link PHY, e.g. for the purpose of efficient power control, scheduling, MCS or ARQ. Each receiver Rxt sends the received data to a combiner 530. The combiner 530 collects the data transmitted from the data sources Txb and which are received through various receivers Rxt and generates one single data flow to the destination.

The wireless interface 305 comprises a Radio Resource Control RRCt protocol module, which is used to configure the transmission scheme according to the invention according to the Radio Resource Control RRCb protocol module of the base station BS which handles the mobile terminal TE.

In a preferred implementation, K equals L, and the via base stations BS to which the splits of data to be transmitted and forwarded to the base station BS which handles the mobile terminal TE are transmitted are the same as the via base stations BS from which splits of data forwarded to the mobile terminal TE are received.

In a variant of realization, the processor 300 of the mobile terminal TE executes the tasks of splitting the flow of data and/or combining the splits in place of the splitter 510 and/or the combiner 530.

In a variant of realization, the processor 300 of the mobile terminal TE executes the tasks of the Radio Resource Control RRCt protocol module.

FIG. 6 is a first algorithm executed by a base station according to the present invention.

More precisely, the present algorithm is executed the processor 200 of each base station BS.

At step S600, the processor 200 checks if a measurement report is received through the wireless interface 205.

Each mobile terminal TE regularly measures, or measures on demand, i.e. after a particular event, the quality measurements of the signals transferred in the measurement channels of different base stations BS.

These measurement reports include information identifying the cells of base stations BS and are reported by the mobile terminal TE to the base station BS which handles the mobile terminal TE.

The quality measurements give the level of SINR of the pilot signals transmitted by the base station BS and observed by the mobile terminal TE.

If a measurement report is received, the processor 200 moves to step S601. Otherwise, the processor 200 moves to step S640.

At step S601, the processor 200 checks if a radio channel has to be added for the mobile terminal TE which sent the measurement report.

As example, a radio channel has to be added when the quality of the signal transferred by another base station BS is higher than the one transferred by the base station BS which is currently handling the mobile terminal TE or the signals transferred by the base station BS or another base station BS in another cell are upper than a given threshold.

A radio channel is composed of a downlink and/or uplink channel between the mobile terminal TE and a base station BS.

If a radio channel has to be added for the mobile terminal TE which sent the measurement report, the processor 200 moves to step S602. Otherwise, the processor 200 moves to step S620.

At step S602, the processor 200 checks if the radio channel has to be setup in a cell controlled by another base station BS.

If the radio channel has to be setup in a cell of another base station BS, the processor 200 moves to step S603. Otherwise, the processor 200 moves to step S610.

At step S603, the processor 200 commands the transfer of a X2 tunnel setup request message to the other base station BS.

The X2 tunnel setup request message requests the other base station BS to establish link or a user plane interface (X2 tunnel) with the base station BS which handles the mobile terminal TE and to establish in the cell of the other base station BS another radio channel (RLC/MAC/PHY) between the other base station BS and the mobile terminal TE.

At next step S604, the processor 200 detects the reception, through the network interface 206, of channel information determined by the other base station BS. The channel information are at least the identifier C-RNTI (Cell Radio Network Temporary Identity) of the mobile terminal TE in the cell of the other base station BS and information identifying the radio channel to be setup.

At next step S605, the processor 200 commands the transfer of a channel setup message to the mobile terminal TE. The channel setup message comprises the C-RNTI and information identifying the radio channel to be setup received at step S604 and an identifier of a cell. A new radio channel is established between the other base station BS and the mobile terminal TE.

As example and in a non limitative way, the information identifying the setup radio channel includes the duplex mode and/or the frequency bands used for the transfer of signals in the uplink and downlink channels and/or the codes or the timeslots used for the transfer of signals in the uplink and downlink signals from/to the mobile terminal TE.

At next step S606, the processor 200 commands the splitter/combiner 410 to split the flow of data to be transferred to the mobile terminal TE in at least two parts. A first split is transferred to the mobile terminal TE directly through its wireless interface 205 by the base station BS which handles the mobile terminal TE and a second split is transferred to the mobile terminal TE by the base station BS which handles the mobile terminal TE through the other base station BS which transferred signals on which quality measurement was correct.

The other base station BS is then a via base station BS.

The mobile terminal TE receives the at least two splits and reconstructs the flow of data.

At next step S607, the processor 200 commands the splitter/combiner 410 to start the reconstruction of the data flow transmitted to the base station BS from at least two received splits of a flow of data transferred by the mobile terminal TE. A first split is received from the mobile terminal TE directly by the base station BS which handles the mobile terminal TE and a second split is received from the mobile terminal TE by the base station BS which handles the mobile terminal TE through the via base station BS. The base station BS which handles the mobile terminal TE reconstructs the flow of data and transfers it to the server AGW.

After that, the processor 200 returns to step S600.

At step S610, the processor 200 determines the channel information for the new radio channel to be setup in a cell of the base station BS which handles the mobile terminal TE. The channel information are at least the identifier C-RNTI of the mobile terminal TE in the cell of the base station BS and information identifying the radio channel to be setup.

At next step S611, the processor 200 commands the transfer of a channel setup message to the mobile terminal TE. The channel setup message comprises the C-RNTI, an identifier of a cell and information identifying the radio channel to be setup. The base station BS and the mobile terminal TE establish a new radio channel.

At next step S612, the processor 200 commands the splitter/combiner 410 to split the flow of data to be transferred to the mobile terminal TE in at least two parts. At least one split is directly transferred by the base station BS which handles the mobile terminal TE through the radio channel established between the base station BS and the mobile terminal TE.

At next step S613, the processor 200 commands the splitter/combiner 410 to start the reconstruction of the flow of data transmitted to the base station BS by the mobile terminal TE from at least two received splits of a flow of data transferred by the mobile terminal TE. At least one split is directly received from the mobile terminal TE by the base station BS which handles the mobile terminal TE through the radio channel established between the base station BS and the mobile terminal TE.

After that, the processor 200 returns to step S600.

At step S620, the processor 200 checks if a radio channel should be removed for the mobile terminal TE which sent the measurement report.

A radio channel should be removed if, for an already established radio channel between one base station BS and the mobile terminal TE, the quality of measurement of the signal transferred by the base station BS is lower than a given threshold.

The radio channel that should be removed is a radio channel established between the terminal and the base station BS which handles the mobile terminal TE or a radio channel established between the terminal and a base station BS which doesn't handle the mobile terminal TE.

If a radio channel should be removed for the mobile terminal TE which sent the measurement report, the processor 200 moves to step S621. Otherwise, the processor 200 returns to step S600.

At step S621, the processor 200 commands the transfer of a channel release message to the mobile terminal TE. The channel release message comprises the identifier of the cell of the base station BS which transferred signal for which the quality of the measurement is lower than the given threshold.

At next step S622, the processor 200 receives, from the mobile terminal TE a channel release confirmation message.

At next step S623, the processor 200 checks if the radio channel has to be released in a cell of another base station BS.

If the radio channel has to be released in a cell of another base station BS, the processor 200 moves to step S630. Otherwise, the processor 200 moves to step S624.

At next step S624, the processor 200 commands the splitter/combiner 410 to decrement the number of splits of the flow of data to be transferred to the mobile terminal TE and to stop to split the flow of data on the radio channel to be released.

At next step S625, the processor 200 commands the splitter/combiner 410 to stop to use data packets received from the released radio channel for the reconstruction of the flow of data transferred by the mobile terminal TE.

After that, the processor 200 returns to step S600.

At step S630, the processor 200 commands the splitter/combiner 410 to stop to split the flow of data in a split to be transferred in the X2 tunnel between the base station BS which handles the mobile terminal TE and the other base station BS which transferred signal for which the quality of the measurement is lower than the given threshold.

At next step S631, the processor 200 commands the transfer of a channel remove request message to the other BS which transferred signal for which the quality of the measurement is lower than a given threshold.

The other base station BS releases the radio channel (RLC/MAC/PHY) between the other base station BS and the mobile terminal TE in the cell of the other base station BS. The other base station BS releases the X2 tunnel between the base station BS which handles the mobile terminal TE and the other base station BS which transferred signal for which the quality of the measurement is lower than the given threshold.

At next step S632, the processor 200 commands the splitter/combiner 410 to stop to use data packets received through the released X2 tunnel for the reconstruction of the flow of data transferred by the mobile terminal TE. The base station BS which handles the mobile terminal TE transfers the flow of data to the server AGW.

After that, the processor 200 returns to step S600.

At step S640, the processor 200 checks if a X2 tunnel setup request message is received from another base station BS which handles another mobile terminal TE.

If a X2 tunnel setup request message is received from another base station BS, the processor 200 moves to step S641. Otherwise, the processor 200 moves to step S650.

At step S641, the processor 200 establishes a X2 tunnel with the other base station BS which handles the other mobile terminal TE.

At next step S642, the processor 200 establishes a radio channel (RLC and MAC stacks, Txt and Rxt modules) between the base station BS and the other mobile terminal TE in the cell of the base station BS identified in the received X2 tunnel setup request message.

At the same step, the processor 200 determines channel information associated to the established radio channel. The channel information are at least the identifier C-RNTI of the other mobile terminal TE in the cell of the base station BS and information identifying the setup radio channel.

As example and in a non limitative way, the channel information associated to the established radio channel also includes the duplex mode and/or the frequency bands used for uplink and downlink signals and/or the codes or the timeslots used for the transfer of uplink and downlink signals from/to the other mobile terminal TE.

At next step S643, the processor 200 commands the transfer of the determined channel information to the other base station BS which handles the other mobile terminal TE.

After that, the processor 200 returns to step S600.

At step S650, the processor 200 checks if a X2 tunnel release request message is received from another base station BS which handles another mobile terminal TE.

If a X2 tunnel release request message is received from another base station BS, the processor 200 moves to step S651. Otherwise, the processor 200 returns to step S600.

At step S651, the processor 200 checks if some packets transferred to the other mobile terminal TE through the radio channel between the base station BS and the other mobile terminal TE have not yet been acknowledged by the other mobile terminal TE.

If some packets have not yet been acknowledged by the other mobile terminal TE, the processor 200 moves to step S652. Otherwise, the processor 200 moves to step S653.

At step S652, the processor 200 commands the transfer of the not acknowledged packets to the other base station BS through the X2 tunnel established with the other base station BS together with an indication of no transmission.

At next step S653, the processor 200 commands the release of the user plane interface (X2 tunnel) with the other base station BS which handles the other mobile terminal TE.

At next step S654, the processor 200 releases the radio channel (RLC and MAC stacks, Txb and Rxb modules) between the base station BS and the other mobile terminal TE in the cell of the base station BS.

After that, the processor 200 returns to step S600.

FIG. 7 is a second algorithm executed by a base station according to the present invention.

More precisely, the present algorithm is executed by the processor 200 of each base station BS in parallel with the algorithm disclosed in reference to the FIG. 6.

At step S700, the processor 200 checks if a packet transferred through a radio channel established between the base station BS and a mobile terminal TE is received by the base station BS.

If a packet transferred through a radio channel established between the base station BS and a mobile terminal TE is received by the base station BS, the processor 200 moves to step S701. Otherwise, the processor 200 moves to step S710.

At step S701, the processor 200 commands the transfer of an acknowledgment of the received packet through the wireless interface 205.

At next step S702, the processor 200 checks if the base station BS handles the mobile terminal TE which transferred the received packet.

If the base station BS handles the mobile terminal TE which transferred the received packet, the processor 200 moves to step S715. Otherwise, the processor 200 moves to step S703.

At step S703, the processor 200 commands the transfer of the packet received at step S700 to the base station BS which handles the mobile terminal TE through the X2 tunnel established with the base station BS which handles the mobile terminal TE.

After that, the processor 200 returns to step S700.

At step S710, the processor 200 checks if a packet is received through a X2 tunnel.

If a packet is received through a X2 tunnel, the processor 200 moves to step S711. Otherwise, the processor 200 moves to step S720.

At step S711, the processor 200 checks if the base station BS handles the mobile terminal TE.

If the base station BS handles the mobile terminal TE, the processor 200 moves to step S712. Otherwise, the processor 200 moves to step S713.

At step S713, the processor 200 commands the transfer of the received packet to the mobile terminal TE through the radio channel established between the base station BS and the mobile terminal TE.

After that, the processor 200 returns to step S700.

At step S712, the processor 200 checks if the received packet is a packet sent back by another base station BS as disclosed at step S652 of the FIG. 6. A packet which is sent back comes together with an indication of no transmission.

If the received packet is a packet sent back, the processor 200 moves to step S721. Otherwise, the processor 200 moves to step S715.

At step S715, the processor 200 commands the splitter/combiner 410 to reconstruct the flow of data transferred to the base station BS from at least two received splits of a flow of data transferred by the mobile terminal TE. A first split is received from the mobile terminal TE directly by the base station BS which handles the mobile terminal TE and a second split is received from the mobile terminal TE by the base station BS which handles the mobile terminal TE through the other base station BS named via base station BS. The base station BS which handles the mobile terminal TE reconstructs the flow of data and transfers it to the server AGW at step S716 through a link named S1 tunnel.

After that, the processor 200 returns to step S700.

At step S720, the processor 200 checks if a packet of data is received from the server AGW.

If data are received from the server AGW, the processor 200 moves to step S721. Otherwise, the processor 200 returns to step S700.

At step S721, the processor 200 commands the splitter/combiner 410 to determine in which path the packet has to be transferred, among the radio channel established between the base station BS and the mobile terminal TE and the X2 tunnels established with other base station or stations BS having established a radio channel with the mobile terminal TE. For that, the splitter/combiner 410 uses the quality indicator information like the quality indicator information coming from all the FIFO under its control to determine, on a per packet base, to which path the packet has to be transferred.

At next step S722, the processor 200 checks if the splitter/combiner 410 has determined that the packet has to be transferred through a X2 tunnel.

If the splitter/combiner 410 has determined that the packet has to be transferred through a X2 tunnel, the processor 200 moves to step S724. Otherwise, the processor 200 moves to step S723.

At step S723, the processor 200 commands the transfer of the packet through the radio channel established between the base station BS and the mobile terminal TE.

After that, the processor 200 returns to step S700.

At step S723, the processor 200 commands the transfer of the packet through the X2 tunnel identified at step S721.

After that, the processor 200 returns to step S700.

FIG. 8 is an example of an algorithm executed by a mobile terminal according to the present invention.

More precisely, the present algorithm is executed by the processor 300 of each mobile terminal TE.

At step S800, the processor 300 commands the transfer of a measurement report to the base station BS which handles it.

Each mobile terminal TE regularly measures, or measures on demand, i.e. after a particular event, the quality measurements of the signals transferred in the measurement channels of different base stations BS.

These measurement reports include information identifying the cells of the base stations BS and are reported by the mobile terminal TE to the base station BS which is currently handling the mobile terminal TE.

In a variant, the mobile terminal TE always transfers the measurement report to the base station BS which handles it through one radio channel established with the base station BS which handles it.

In another variant, the mobile terminal TE transfers the measurement report to the base station BS which handles it through the radio channel having the highest quality among the radio channels the mobile terminal TE has established with any base stations BS.

The quality measurements typically give the level of SINR of the pilot signals transmitted by the base stations BS and observed by the mobile terminal TE.

At next step S801, the processor 300 checks if a channel setup message is received through the wireless interface 305. The channel setup message comprises a C-RNTI, an identifier of a cell and information identifying the radio channel being setup.

As example and in a non limitative way, the channel information associated to the radio channel being setup also includes the duplex mode and/or the frequency bands used for uplink and downlink signals and/or the codes or the timeslots used for the transfer of uplink and downlink signals from/to the mobile terminal TE.

The channel setup message is preferably transferred by the base station BS which handles the mobile terminal TE. The channel setup message may also be transferred by another base station BS with which a radio channel has been setup.

If a channel setup message is received, the processor 300 moves to step S802. Otherwise, the processor 300 moves to step S810.

At step S802, the processor 300 establishes a new radio channel in the cell identified in the channel setup message and uses the C-RNTI comprised in the received message and information identifying the radio channel to be setup.

At next step S803, the processor 300 commands the splitter 510 to split the flow of data to be transferred to the base station BS which handles the mobile terminal TE in at least two parts.

A first split is directly transferred to the base station BS which handles the mobile terminal TE and a second split is transferred to the base station BS which handles the mobile terminal TE through the other base station BS with which the radio channel has been setup at step S802.

At next step S804, the processor 300 commands the combiner 530 to start the reconstruction of the data flow transmitted to the mobile terminal TE from at least two received splits of a flow of data received by the mobile terminal TE. A first split is directly received by the mobile terminal TE from the base station BS which handles the mobile terminal TE and a second split is received by the mobile terminal TE from the base station BS which handles the mobile terminal TE through the other base station BS with which the radio channel has been setup at step S802.

At step S805, the processor 300 commands the transfer of a channel setup confirmation message to the base station BS which handles the mobile terminal TE.

In a variant, the mobile terminal TE always transfers the channel setup confirmation message to the base station BS which handles it through one radio channel established with the base station BS which handles it.

In another variant, the mobile terminal TE transfers the channel setup confirmation to the base station BS which handles it through the radio channel having the highest quality among the radio channels the mobile terminal TE has established with any base stations BS.

In yet another variant, the mobile terminal TE transfers the channel setup confirmation to the base station BS which handles it through the radio channel established at step S802.

After that, the processor 300 returns to step S800.

At step S810, the processor 300 checks if a channel remove message is received through the wireless interface 305. The channel setup message comprises a C-RNTI, an identifier of a cell and information identifying the radio channel to be released.

If a channel remove message is received, the processor 300 moves to step S811. Otherwise, the processor 300 moves to step S820.

At step S811, the processor 300 commands the splitter 510 to stop to split the flow of data in the part to be transferred through the radio channel to be released.

At step S812, the processor 300 checks if some packets transferred by the mobile terminal TE through the radio channel to be deleted have not yet been acknowledged by the base station BS with which the radio channel has to be deleted.

If some packets have not yet been acknowledged by the base station BS, the processor 300 moves to step S813. Otherwise, the processor 300 moves to step S815.

At next step S813, the processor 300 selects another radio channel, as example the radio channel between the mobile terminal TE and the base station BS which handles the mobile terminal TE.

At step S814, the processor 300 commands the transfer of the not acknowledged packets to the base station BS which handles the mobile terminal TE through the radio channel selected at step S813.

At next step S815, the processor 300 commands the release of the radio channel (RLC and MAC stacks, Txt and Rxt modules).

At next step S816, the processor 300 commands the combiner 530 to stop to use data packets received through the released radio channel for the reconstruction of the flow of data transmitted to the mobile terminal TE.

After that, the processor 300 returns to step S800.

At step S820, the processor 300 checks if a data packet has to be transferred to the base station BS which handles the mobile terminal TE.

If a data packet has to be transferred, the processor 300 moves to step S821. Otherwise, the processor 300 moves to step S830.

At step S821, the processor 300 commands the splitter 510 in order to select one radio channel through which the packet has to be transferred.

For that, the splitter 510 uses the quality indicator information like the one coming from all the FIFO under its control to determine, on a per packet basis, through which radio channel the packet has to be transferred.

As example, the splitter 510 selects the radio channel with best quality indicator information having a FIFO length below a given threshold.

At next step S822, the packet is transferred to the transmitter Txt handling the transmission of signal to the base station BS which handles the mobile terminal TE through the selected radio channel. The length of the corresponding FIFO is incremented by the size of the data packet. Once the adapt packet is acknowledged by the receiver Rxb, the length of the corresponding FIFO is decremented by the size of the data packet.

After that, the processor 300 returns to step S800.

At step S830, the processor 300 checks if a packet is received through the wireless interface 305.

If a packet is received at step S830, the processor moves to step S831. Otherwise, the processor 300 returns to step S800.

At step S831, the processor 300 commands the transfer of an acknowledgment of the received packet to the base station BS with which the radio channel on which the packet has been received is established.

At next step S832, the processor 300 commands the combiner 530 to reconstruct the flow of data using the received packet.

After that, the processor 300 returns to step S800.

Naturally, many modifications can be made to the embodiments of the invention described above without departing from the scope of the present invention.

The invention claimed is:

1. A method for transferring a flow of data by a first telecommunication device to a second telecommunication device in a wireless cellular telecommunication network, the first and second telecommunication devices being linked through a radio channel, the method being executed by the first telecommunication device, the method comprising steps of:

splitting the flow of data in at least two splits, each split corresponding to different portions of the flow of data;

transferring a first split directly to the second telecommunication device through the radio channel that links the first and second telecommunication devices;

transferring at least a second split to the second telecommunication device via at least a third telecommunication device, the third telecommunication device being a first base station of the wireless cellular telecommunication network, the first telecommunication device being a second base station of the wireless cellular telecommunication network, and the second telecommunication device being a mobile terminal;

receiving, from the mobile terminal, a measurement report on signals transferred by plural base stations;

determining, from the measurement report, if the flow of data has to be split in a more important or less important number of splits, and if the flow of data has to be split in a more important number of splits, establishing a link between the second base station and a third base station which transferred signals on which measurement reported by the mobile terminal are upper than a given value, obtaining from the third base station information related to a radio channel between the third base station and the mobile terminal, transferring the information related to the radio channel between the third base station and the mobile terminal, to the mobile terminal, splitting the flow of data into an incremented number of splits, and transferring a supplementary split to the mobile terminal via the third base station through the established link.

2. The method according to claim 1, wherein if the flow of data has to be split in a less important number of splits, the method further comprising steps of:

releasing a link between the second base station and the first base station;

transferring to the mobile terminal information related to a radio channel between the first base station and the mobile terminal; and splitting the flow of data into a reduced number of splits.

3. The method according to claim 2, further comprising steps of:

receiving packets from the first base station prior to the release of the link between the second base station and a first base station; and transferring the received packets to the mobile terminal.

4. The method according to the claim 1, further comprising steps of:

receiving from a fourth base station a message representative of a request to establish a link between the second base station and the fourth base station and of a request to establish a radio channel with an other mobile terminal;

establishing a link between the second base station and the fourth base station;

determining information related to the radio channel between the second base station and the other mobile terminal;

establishing the radio channel between the second base station and the other mobile terminal; and transferring information related to the radio channel between the second base station and the other mobile terminal to the fourth base station.

5. The method according to the claim 4, further comprising steps of:

receiving data from the fourth base station through the link between the second base station and the fourth base station; and transferring through the radio channel established between the second base station and the other mobile terminal the data received from the fourth base station.

6. The method according to the claim 4, further comprising steps of:

receiving data from the other mobile terminal through the radio channel established between the second base station and the other mobile terminal; and transferring through the link between the second base station and the fourth base station the data received from the other mobile terminal.

7. The method according to claim 6, further comprising steps of:

receiving from the fourth base station a message representative of a request to release a link between the second base station and the fourth base station;

stopping transmitting data received from the fourth base station to the other mobile terminal through the radio channel established between the second base station and the other terminal;

checking if data transferred through the radio channel between the second base station and the other mobile terminal have not been acknowledged by the mobile terminal; and transferring the data to the fourth base station if data have not been acknowledged.

8. The method according to claim 7, further comprising steps of:

releasing the link between the second base station and the fourth base station; and releasing the radio channel between the second base station and the other mobile terminal.

9. The method according to claim 1, wherein the flow of data is decomposed into packets of data and in that each split is decomposed into different packets of data, each packet of data being marked by an information representative of an order of the packet of data in the flow of data.

10. A method for transferring a flow of data by a first telecommunication device to a second telecommunication device in a wireless cellular telecommunication network, the first and second telecommunication devices being linked through a radio channel, the method being executed by the first telecommunication device, the method comprising steps of:

splitting the flow of data in at least two splits, each split corresponding to different portions of the flow of data;

transferring a first split directly to the second telecommunication device through the radio channel that links the first and second telecommunication devices;

transferring at least a second split to the second telecommunication device via at least a third telecommunication device, the third telecommunication device being a first base station of the wireless cellular telecommunication network, the first telecommunication device being a mobile terminal, and the second telecommunication device being a second base station of the wireless cellular telecommunication network;

measuring signals transferred by plural base stations;

transferring to the second base station a measurement report representative of the measurements;

receiving a message comprising information related to a radio channel to be setup between the mobile terminal and a third base station;

establishing the radio channel between the mobile terminal and the third base station;

splitting the flow of data in an incremented number of splits;

transferring a supplementary split to the second base station via the third base station through the established radio channel;

receiving a message requesting the release of the radio channel established between the mobile terminal and the first base station;

checking if data transferred through the radio channel between the mobile terminal and the first base station have not been acknowledged by the first base station;

transferring the non acknowledged data to the second base station through another radio channel;

releasing the radio channel established between the mobile terminal and the first base station; and splitting the flow of data into a reduced number of splits.

11. The method according to claim 10, wherein the flow of data is decomposed into packets of data, each packet of data being marked by information representative of an order of the packet of data in the flow of data.

12. A device for transferring a flow of data by a first telecommunication device to a second telecommunication device in a wireless cellular telecommunication network, the first and second telecommunication devices being linked through a radio channel, wherein the device is included in the first telecommunication device, the device comprising:

means for splitting the flow of data in at least two splits, each split corresponding to different portions of the flow of data;

means for transferring a first split directly to the second telecommunication device through the radio channel that links the first and second telecommunication devices; and means for transferring at least a second split to the second telecommunication device via at least a third telecommunication device, the third telecommunication device being a first base station of the wireless cellular telecommunication network, the first telecommunication device being a second base station of the wireless cellular telecommunication network, and the second telecommunication device being a mobile terminal;

means for receiving, from the mobile terminal, a measurement report on signals transferred by plural base stations;

means for determining, from the measurement report, if the flow of data has to be split in a more important or less important number of splits, and if the flow of data has to be split in a more important number of splits, means for establishing establishes a link between the second base station and a third base station which transferred signals on which measurement reported by the mobile terminal are upper than a given value, means for obtaining obtains from the third base station information related to a radio channel between the third base station and the mobile terminal, means for transferring transfers the information related to the radio channel between the third base station and the mobile terminal, to the mobile terminal, means for splitting splits the flow of data into an incremented number of splits, and means for transferring transfers a supplementary split to the mobile terminal via the third base station through the established link.

13. A device for transferring a flow of data by a first telecommunication device to a second telecommunication device in a wireless cellular telecommunication network, the first and second telecommunication devices being linked through a radio channel, wherein the device is included in the first telecommunication device, the device comprising:

a splitter configured to split the flow of data in at least two splits, each split corresponding to different portions of the flow of data;

a transferring unit configured to transfer a first split directly to the second telecommunication device through the radio channel that links the first and second telecommunication devices;

a transferring unit configured to transfer at least a second split to the second telecommunication device via at least a third telecommunication device, the third telecommunication device being a first base station of the wireless cellular telecommunication network, the first telecommunication device being a second base station of the wireless cellular telecommunication network, and the second telecommunication device being a mobile terminal;

a receiving unit configured to receive, from the mobile terminal, a measurement report on signals transferred by plural base stations;

a determining unit configured to determine, from the measurement report, if the flow of data has to be split in a more important or less important number of splits, and if the flow of data has to be split in a more important number of splits, an establishing unit establishes a link between the second base station and a third base station which transferred signals on which measurement reported by the mobile terminal are upper than a given value, an obtaining unit obtains from the third base station information related to a radio channel between the third base station and the mobile terminal, a transferring unit transfers the information related to the radio channel between the third base station and the mobile terminal, to the mobile terminal, a splitter splits the flow of data into an incremented number of splits, and a transferring unit transfers a supplementary split to the mobile terminal via the third base station through the established link.

* * * * *